Patented Dec. 12, 1939

2,183,084

UNITED STATES PATENT OFFICE 2,183,084

METHOD OF MAKING ACTIVATED GELATIN

Stanton Reynolds, Greenford, England, assignor, by mesne assignments, to Atlantic Coast Fisheries Company, New York, N. Y., a corporation of Maine No Drawing. Application February 12, 1938, Serial No. 190,229. In Great Britain February 24, 1937

16 Claims. (Cl. 99—11)

This invention relates to an improved process for the production of activated gelatin preparations in finely divided form, i. e., granules, particles, beadlets, etc.

It has been known for some time that certain substances, such as, for example, vitamin A, are not stable when exposed to the atmosphere, and such substances have been prepared for use within gelatin capsules. It has also been proposed to enclose drugs, medicaments and the like of unpleasant taste or smell in gelatin capsules in order to render them easier to take.

The term "activated gelatin" as used herein means gelatin in which there is or are incorporated any one or more other substances which it is desired for any reason to administer either medicinally and/or as a food. In general, the process will be applicable to any substance or mixture which can either itself be emulsified with an aqueous gelatin solution or which can be prepared in the form of a suitable solution which can be so emulsified.

In United States application Serial No. 113,988, an oil containing a vitamin, such as vitamin A or vitamin A concentrate, is emulsified in an aqueous solution of a colloidal substance, preferably gelatin, the latter being free of oxidising substances, such as peroxides, air bubbles, etc., to produce a primary emulsion. This primary emulsion is then dispersed in an immiscible liquid, such as mineral oil, cottonseed oil, cocoanut oil, etc., whereby a polyphase emulsion is produced. In the polyphase emulsion, the immiscible liquid constitutes the continuous phase and gelatin emulsion constitutes the dispersed phase. After the polyphase emulsion has been appropriately treated to gel the gelatin emulsion sufficiently to permit handling, the gelled particles, preferably in the presence of the immiscible liquid, are dried. Finally, the dried particles are separated from the immiscible liquid. In this manner the preparation is obtained in the form of small substantially spherical particles of gelatin containing the vitamin A.

The instant invention is an improvement on the process immediately hereinbefore described and has for an object the provision of a method of producing an activated gelatin preparation in finely divided form.

Other objects will become apparent from the following description and appended claims.

According to one feature of the invention the water is wholly or in part removed from the gel by means of water-miscible extracting agents.

In one form of the invention, a primary emulsion is first produced from water, gelatin and the material which is desired to be incorporated in the final product. The primary emulsion is then dispersed in an oil which is soluble in a water extracting agent and preferably one which tends to harden the gelatin particles. The polyphase emulsion is then appropriately treated to gel the gelatin dispersion. Then the continuous phase is removed by the water extracting agent which preferably also tends to harden the gelatin particles. In other words, the gel mass is subjected to a liquid treatment whereby the oil constituting the continuous phase is removed and the gelatin particles dehydrated.

For the continuous phase of the polyphase emulsion any suitable oil may be employed and vegetable oils, such as castor oil, soya bean oil, cottonseed oil, etc., may advantageously be used.

As the liquid for removing the continuous phase, any substance which dissolves the oil and preferably one which also extracts water from the gelatin particles may be used. Preferably, also, the liquid should tend to harden the gelatin particles. Acetone, alcohol, isopropyl alcohol, normal propyl alcohol, dioxane, etc., may be mentioned as illustrative examples.

Obviously, it is not essential that the same liquid which removes the oil be also used to dehydrate and harden the particles. The use of one liquid, for example, ether, to remove the oil and another, for example, alcohol, to dehydrate would also fall within the scope of the present invention. In this case an oil which is not soluble in the water extracting agent, such as a mineral oil may be employed.

The gel formation may be effected by appropriately cooling the polyphase emulsion, such as, for example, by stirring the said emulsion in a brine-cooled vessel, preferably at a temperature of 8° C. or below.

The removal of the oil and water is preferably effected by grinding the gel with the selected liquid filtering off the liquid and oil and repeatedly washing the residue with fresh liquid. The residue is then preferably allowed to stand in contact with fresh liquid with occasional stirring until the particles are sufficiently dehydrated, whereupon the bulk of the liquid is removed by filtration and the remainder at a temperature, preferably not above about 30° C. The resulting product consists of finely divided substantially spherical particles which may be sifted into the desired grades.

It is preferred to incorporate in the products, substances which improve the keeping qualities of the product for example by physically or chemically preventing or retarding oxidation of the active substances. Such substances may be added at any stage of the process and preferably to the starting materials. Substances which reduce the porosity of the products may advantageously be employed for the purpose of reducing or preventing access of oxygen to the active substances and/or chemical antioxidants may be used. It has been found that additions of sugar and/or softening agents such as glycerine improve the keeping qualities of the final product.

In a preferred form of carrying out the invention the gel formed from the polyphase emulsion is treated with one or more liquids, preferably in a Buchner funnel or similar plant, to remove the oil and a part only of the water which it contains. The remainder of the water is then removed by air-drying or other suitable drying operation. Preferably, the dehydration with liquids is carried only so far as to give granules which are sufficiently free from water as not to coalesce on subsequent air-drying. This embodiment permits expediting the process and reducing the quantity of liquid employed in working up the gel.

In order to more fully explain the invention, the following illustrative examples are set forth:

Example I

A 40% aqueous solution of gelatin is first prepared by dissolving 500 grms. of gelatin powder in 750 ccs. of water. It is preferable, but not essential, to use distilled water, and the mixture should be agitated with a mechanical stirrer and kept at a temperature of about 65° C. 125 grms. of vitamin A solution or vitamin A concentrate (500,000 I. U./grm.) previously heated to 65° C. are slowly added to this solution. The agitation is increased by raising the speed of the agitator, or a suitable mechanical homogenizer can be used and the agitation is continued until emulsification is complete, the temperature being maintained at 65° C. In this way a primary emulsion is obtained.

A solution of castor oil and alcohol, e. g., industrial methylated spirit, in the proportion of about 3:1 by volume is then prepared and about 80 ccs. of this solution are used for every 100 grms. of the primary emulsion. It should be noted that the spirit used at this stage serves merely as a diluent, and is otherwise not essential. In the present case about 1040 ccs. of the solution, kept at about 65° C. are used under such conditions that a polyphase emulsion with castor oil as the continuous phase is formed. In the present example the primary emulsion is gradually added to the diluted oil whilst agitating with a high speed mixer. When a satisfactory polyphase emulsion of even colour has been produced, the cooling step is carried out.

For this purpose it is preferred to introduce a beater type paddle or the like for keeping the mass in motion whilst it is cooled by surrounding the vessel with a brine solution at about 8° C. or below. When the fluid particles composing the emulsion have gelled sufficiently, which generally occurs in about 30 minutes, the mass is treated with alcohol.

For this purpose it is transferred to a mortar or jarmill, about 2860 ccs. of industrial methylated spirit added and the mixture is ground for about 4 hours, the spirit and castor oil filtered off and the residue washed several times with spirit until free from oil. The residue is then preferably removed to a closed vessel and covered with industrial methylated spirit, or preferably absolute alcohol, being allowed to stand with occasional stirring until the particles are sufficiently dehydrated. The bulk of the spirit or alcohol is then removed by filtration, and the remainder by evaporation at a temperature preferably not above about 30° C. The resulting product, which consists of finely divided substantially spherical particles, may be sifted into the desired grades. The yield should amount to approximately 600 grms. having a vitamin A value of about 100,000 I. U./grm.

The treatment of the gelled particles by grinding with alcohol (or other suitable liquid dehydrating agent) is an important step in the process as it serves not only to remove the continuous phase oil, but also to dehydrate and harden the particles, this hardening penetrating throughout the particles, owing to the prolonged treatment.

Example II

A 35% aqueous solution of gelatin is first prepared with the addition of 2½% glycerin and 2½% sugar by dissolving 500.5 grms. of gelatin powder, 35.75 grms. glycerin and 35.75 grms. sugar in 854 ccs. of water. Solution is effected by keeping the mixture at a temperature of about 65° C. whilst agitating it with a mechanical stirrer. 125 grms. of vitamin A solution (500,000 I. U./grm.) previously heated to 65° C. are slowly added to this solution. The agitation is increased by raising the speed of the agitator, or a suitable mechanical homogenizer can be used, and the agitation is continued until emulsification is complete, the temperature being maintained at about 65° C.

The primary emulsion so prepared is then added slowly to excess (i. e., about 1,500 ccs.) of pure castor oil at a temperature of 65° C., the whole being continually agitated by means of a high speed mixer until a satisfactory polyphase emulsion has been produced. The size of the final granules is determined by the amount of agitation.

At this stage, whilst continuing the agitation, the vessel is surrounded with a brine solution for a time sufficient to ensure that the gelatin particles are completely gelled. The mass of polyphase emulsion so formed is transferred to a Buchner funnel or similar plant and is then treated with cold acetone (0–3° C.).

The first portion of cold acetone (about 1,000 ccs.) removes the bulk of castor oil from around the granules. Successive portions of cold acetone (each about 1,000 ccs.) remove the remainder of the castor oil. Washing of the granules continues until the surfaces are sufficiently dehydrated to obviate any coalescence of the particles for a period of time sufficient to allow the granules to be transferred to trays, which in turn are placed in an air conditioned atmosphere for the final drying of these granules.

When the granules are sufficiently dried, they are graded by sifting and stored in air-tight containers.

About 600 grms. of "A" gel granules, having a vitamin A value of about 100,000 I. U./grm. are prepared by the above method.

In the foregoing the invention has been described as applied to the treatment of vitamin A. It will, however, be apparent that it can be used for many other purposes and, in fact, it can be applied to any oil which will form emulsions with solutions containing gelatin.

Moreover, the various details of temperature, times and the like should be regarded as examples only. Thus, the temperatures employed at the various stages will be determined by the nature of the materials being treated. During the emulsification stages the temperature will be controlled according to the safety limits of the material being treated, and the viscosity of the phases.

Moreover, as already stated, it is not essential in Example I to dilute the castor oil or the like. A very fine product may be obtained by using undiluted castor oil, the product being finer if the two phases are of about the same viscosity. Under the same conditions of agitation the particles will be larger, the higher the viscosity of the continuous phase of the polyphase emulsion.

It will also be understood that whilst in Example II the conjoint use of sugar and glycerin is described, either of those substances may, if desired, be employed alone. The use of either or both of the said substances need not necessarily be followed by the modified form of the final step of the described process, in which the only partial dehydration is effected by treating with liquids, and conversely, this modified form of the final step may also be employed when neither of the said substances is present.

Since it is obvious that various changes and modifications may be made in the above description without departing from the nature or spirit thereof, this invention is not restricted except as set forth in the appended claims.

I claim:

1. A method of making activated gelatin preparations in finely divided form which comprises producing a polyphase dispersion in which liquid droplets of gelatin containing a vitamin A liquid dispersed therein constitute the dispersed phase and a vegetable oil constitutes the continuous phase, causing the droplets to solidify, removing the oil by treatment with an oil solvent, and removing at least a part of the water by treatment with a water-extracting agent.

2. A method of making activated gelatin preparations in finely divided form which comprises producing a polyphase dispersion in which liquid droplets of gelatin containing a substance dispersed therein constitute the dispersed phase and a vegetable oil constitutes the continuous phase, causing the droplets to solidify, and treating the mass with a liquid which dissolves the oil and dehydrates the gelatin particles.

3. A method of making activated gelatin preparations in finely divided form which comprises producing a polyphase dispersion in which liquid droplets of gelatin containing a substance dispersed therein constitute the dispersed phase and a vegetable oil constitutes the continuous phase, causing the droplets to solidify, treating the mass with an oil solvent to remove the oil, and then treating the mass with a liquid dehydrating agent to dehydrate the gelatin particles.

4. A method of making activated gelatin preparations in finely divided form which comprises producing a polyphase dispersion in which liquid droplets of gelatin containing a vitamin A liquid dispersed therein constitute the dispersed phase and a vegetable oil constitutes the continuous phase, causing the droplets to solidify, washing the mass with a liquid which dissolves the oil and dehydrates the gelatin particles until the oil has been removed and the gelatin particles sufficiently dehydrated.

5. A method of making activated gelatin preparations in finely divided form which comprises producing a polyphase dispersion in which liquid droplets of gelatin containing a vitamin A liquid dispersed therein constitute the dispersed phase and a vegetable oil constitutes the continuous phase, causing the droplets to solidify, washing the mass with a liquid which dissolves the oil and dehydrates the gelatin particles until the oil has been removed and the gelatin particles sufficiently dehydrated to obviate coalescence of the particles for a sufficient period of time to permit the particles to be transferred to a drying medium, and drying said particles.

6. A method of making activated gelatin preparations in finely divided form which comprises producing a polyphase dispersion in which liquid droplets of gelatin containing a substance dispersed therein constitute the dispersed phase and a vegetable oil constitutes the continuous phase, causing the droplets to solidify, and treating the mass with alcohol until the oil has been removed and the gelatin particles dehydrated.

7. A method of making activated gelatin preparations in finely divided form which comprises producing a polyphase dispersion in which liquid droplets of gelatin containing a substance dispersed therein constitute the dispersed phase and a vegetable oil constitutes the continuous phase, causing the droplets to solidify, and treating the mass with acetone until the oil has been removed and the gelatin particles dehydrated.

8. A method of making activated gelatin preparations in finely divided form which comprises producing a polyphase dispersion in which liquid droplets of gelatin containing a vitamin A liquid dispersed therein constitute the dispersed phase and a vegetable oil constitutes the continuous phase, causing the droplets to solidify, washing the mass with cold acetone until the oil has been removed and the gelatin particles dehydrated to the desired degree.

9. The method of making activated gelatin preparations in granular form which comprises producing a polyphase dispersion of liquid droplets of an aqueous solution of activated gelatin in an oil, causing the droplets to gel, removing the oil by treatment with an oil solvent, and removing at least a part of the water by treatment with a water-extracting agent.

10. The method of making activated gelatin preparations in granular form which comprises producing a polyphase dispersion of liquid droplets of an aqueous solution of gelatin containing vitamin A liquid in an oil, causing the droplets to gel, removing the oil by extraction with a solvent and immediately removing a part at least of the water from the gelled droplets by extraction with a water miscible liquid.

11. The method of making activated gelatin preparations in granular form which comprises producing a polyphase dispersion of liquid droplets of an aqueous solution of activated gelatin in an oil which is miscible with a water-extracting agent, causing the droplets to gel and removing the oil and a part at least of the water by means of the water-extracting agent.

12. The method of making activated gelatin preparations in granular form which comprises producing a polyphase dispersion of liquid droplets of an aqueous solution of activated gelatin and a softening agent in an oil, causing the droplets to gel, removing the oil by treatment with an oil solvent, and removing at least a part of the water by treatment with a water-extracting agent.

13. The method of making activated gelatin preparations in granular form which comprises producing a polyphase dispersion of liquid droplets of an aqueous solution of activated gelatin and a softening agent in an oil which is miscible with a water-extracting agent, causing the droplets to gel and removing the oil and a part at least of the water by means of the water-extracting agent.

14. The method of making activated gelatin preparations in granular form which comprises producing a polyphase dispersion of liquid droplets of an aqueous solution of activated gelatin, sugar and glycerin, in an oil which is miscible with a water-extracting agent, causing the droplets to gel and removing the oil and a part at least of the water by means of the water-extracting agent.

15. The method of making activated gelatin preparations in granular form which comprises producing a polyphase dispersion of liquid droplets of an aqueous solution of activated gelatin in a mixture of castor oil and alcohol, causing the droplets to gel and removing the oil and a part at least of the water by liquid treatment.

16. The method of making activated gelatin preparations in granular form which comprises producing a polyphase dispersion of liquid droplets of an aqueous solution of activated gelatin, sugar and glycerin in castor oil, causing the droplets to gel and removing the oil and a part at least of the water by treatment with an oil solvent and water-extracting agent.

STANTON REYNOLDS.